United States Patent [19]
Guscott

[11] Patent Number: 4,625,115

[45] Date of Patent: Nov. 25, 1986

[54] CEILING MOUNTABLE PASSIVE INFRARED INTRUSION DETECTION SYSTEM

[75] Inventor: John K. Guscott, Lynnfield, Mass.

[73] Assignee: American District Telegraph Company, New York, N.Y.

[21] Appl. No.: 680,308

[22] Filed: Dec. 11, 1984

[51] Int. Cl.[4] .............. G01J 5/08

[52] U.S. Cl. .............. 250/353; 250/342; 350/627

[58] Field of Search .............. 250/342, 353; 350/612, 350/613, 628, 629, 630, 627

[56] References Cited

U.S. PATENT DOCUMENTS

| | | | |
|---|---|---|---|
| 3,036,219 | 5/1962 | Thompson . | |
| 3,453,432 | 7/1969 | McHenry | 250/338 PY |
| 3,524,180 | 9/1970 | Cruse . | |
| 3,551,676 | 12/1970 | Runnels | 250/353 |
| 3,631,434 | 12/1971 | Schwartz . | |
| 3,703,718 | 11/1972 | Berman . | |
| 3,886,360 | 5/1975 | Reiss et al. | 250/353 |
| 4,375,034 | 2/1983 | Guscott | 250/353 |
| 4,385,833 | 5/1983 | Gardner | 250/353 |
| 4,442,359 | 4/1984 | Lederer | 250/353 |

*Primary Examiner*—Carolyn E. Fields

*Attorney, Agent, or Firm*—Weingarten, Schurgin, Gagnebin & Hayes

[57] ABSTRACT

The ceiling mountable passive infrared intrusion detection system of the present invention includes a focusing mirror having an optical axis, and a composite field-forming mirror cooperative with the focusing mirror for providing both a plurality of vertical curtains and a plurality of uniform detection sensitivity finger beams defining fields of view in selected azimuthally spaced relation through which an intruder must pass when in motion about the floor of a protected facility. The composite field-forming mirror includes first and second pluralities of selectively-twisted cylindrical facets defining longitudinal axes that individually intersect the optical axis of the focusing mirror at preselected different non-zero acute angles and provide corresponding ones of the selectively azimuthally spaced fields of view of the vertical curtains. The composite field-forming mirror includes a third plurality of planar facets having normals that are orthogonal to corresponding ones of the longitudinal axes of the selectively-twisted cylindrical facets to provide the fields of view of the finger beams. The composite field-forming mirror defines an effectively continuous optical aperture.

8 Claims, 6 Drawing Figures

CEILING MOUNTABLE PASSIVE INFRARED INTRUSION DETECTION SYSTEM

This invention is related to U.S. Pat. No. 4,375,034, and to U.S. application Ser. No. 454,852, now U.S. Pat. No. 4,514,631 each of the same inventive entity and assigned to the same assignee, and both incorporated herein by reference.

FIELD OF THE INVENTION

Passive infrared intrusion detection systems are known for sensing the presence of an intruder in a protected space and for providing an output signal representative of intruder detection. Examples of passive infrared intrusion detector systems are shown in U.S. Pat. Nos. 3,036,219; 3,524,180; 3,631,434; 3,703,718; and 3,886,360, all incorporated herein by reference. It is an object of the present invention to provide an infrared intrusion detection system especially suited for ceiling mounting having a mirror assembly cooperative to provide several azimuthally spaced fields of view defining a quadrant through which an intruder must pass when moving about the floor area of a protected facility.

SUMMARY OF THE INVENTION

Briefly, the ceiling mountable passive infrared intrusion detection system of the present invention provides a first plurality of generally vertical radially outwardly extending comparatively long-range first partial curtains disposed in azimuthally spaced relation; provides a second plurality of generally vertical radially outwardly extending and comparatively short-range second partial curtains disposed in azimuthally spaced relation; and provides a third plurality of generally horizontal radially outwardly extending comparatively long-range finger beams disposed in azimuthally spaced relation. The first and second pluralities of partial vertical curtains each have a comparatively broad field of view in the vertical plane and a comparatively small field of view in the horizontal plane, and are selectively cooperative to provide full vertical curtains having a field of view through which an intruder must pass when moving about the floor of a protected facility. The curtains are preferably azimuthally spaced to provide a quadrant of protection. The plurality of generally horizontal finger beams overlap a portion of each of the full vertical curtains. Each of the finger beams provides a field of view having a uniform detection sensitivity. An intruder when moving about the floor of a protected facility passes through the uniform detection sensitivity finger beams that thereby provide redundant and failsafe detection of intruder presence.

The system of the invention includes a focusing mirror and a composite mirror having both laterally adjacent strip-like selectively-twisted cylindrical facets and laterally adjacent planar facets defining an effectively continuous optical aperture. Each of the selectively-twisted cylindrical facets of the composite mirror is cooperative with the focusing mirror to provide the field of view of a corresponding one of the generally vertical comparatively long-range and comparatively short-range partial curtains. Each of the planar facets of the composite mirror is cooperative with the focusing mirror to provide the field of view of a corresponding one of the generally horizontal and comparatively long-range finger beams. An infrared detector is disposed along the optical axis of the focusing mirror and at the focus thereof to provide an electrical signal in response to radiation received from the fields of view of the system.

BRIEF DESCRIPTION OF THE DRAWINGS

The invention will be more fully understood from the following detailed description taken in conjunction with the accompanying drawings in which.

DETAILED DESCRIPTION OF THE PREFERRED EMBODIMENT

Figure 1:
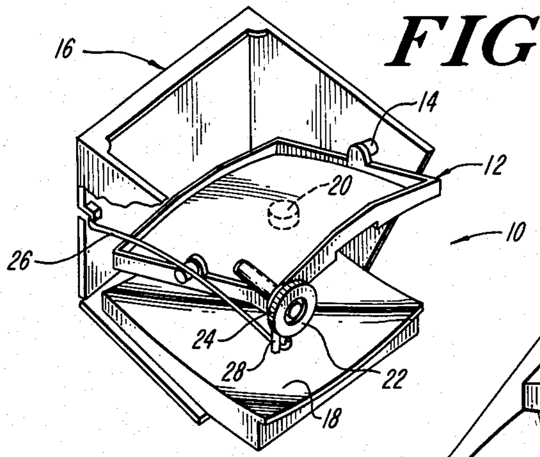
FIG. 1 is a perspective view, partially broken away, of a ceiling mountable passive infrared intrusion detection system according to the present invention.

Referring now to FIG. 1, generally designated at 10 is a partially broken away perspective view of the novel ceiling mountable passive infrared intrusion detection system according to the present invention. The system 10 includes a composite field-forming mirror generally designated 12 to be described rotatably mounted on integral pivots 14 to the sides of a housing generally designated 16 provided therefor. A spherical focusing mirror 18 is mounted on a bottom wall of the housing 16 and in spaced relation to the composite field-forming mirror 12. A detector illustrated in dashed outline 20 is mounted in an aperture provided therefor in the composite field-forming mirror 12 along the optical axis of the focusing mirror 18 and at the point focus thereof. A knob 22 having a peripheral stepped cam surface 24 is rotatably mounted in a bushing, not shown, provided therefor on a side of the housing 16, and a spring arm 26 is mounted over one of the pivots 14 and fastened on one of its ends to the housing 16 and on the other of its ends to a tab 28 provided therefor on the composite field-forming mirror 12. Manual rotation of the knob 22 by either a system installer or a system user selectively brings different portions of the stepped cam surface thereof into contact with the tab 28 for selectively tilting the field-forming mirror 12 about the pivots 14. The mirrors 12, 18 preferably are integrally formed thermoplastic members that are flash-metalized to provide a specular surface.

Figure 2:
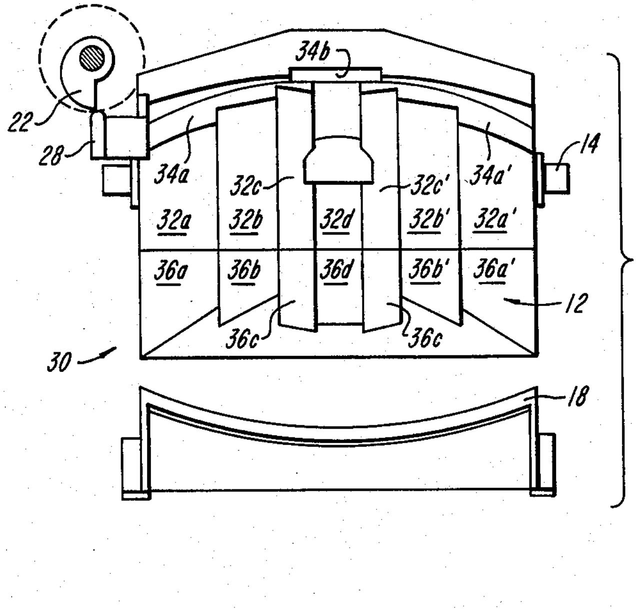
FIG. 2 is a front elevational view of the ceiling mountable passive infrared intrusion detection system according to the present invention.

As can be seen in FIG. 2, which generally designates at 30 a front elevational view of the ceiling mountable passive infrared intrusion detection system of the invention, the composite field-forming mirror 12 includes a first plurality of laterally adjacent selectively-twisted cylindrical facets **32*a*, *a*' through 32*d* in strip-form to be described arranged in a row; a superadjacent second plurality of laterally adjacent selectively-twisted cylindrical facets 34*a*, 34*a*', 34*b* to be described arranged in a row; and a subjacent plurality of laterally adjacent planar facets 36*a*, *a*' through 36*d* to be described arranged in a row. Each of the facets 32, 34, 36 deviate infrared energy present in its corresponding field of view to be described onto the confronting cooperative surface of the spherical focusing mirror 18. The focusing mirror 18 deviates the received infrared energy from each of the several fields of view of the facets of the field-forming mirror 12 onto the detector 20** (FIG. 1) disposed about its optical axis and at its point focus. Conventional signal processing circuitry, not shown, is operative in response to the detector output signals for providing an alarm indication of intruder presence.

Figure 3:
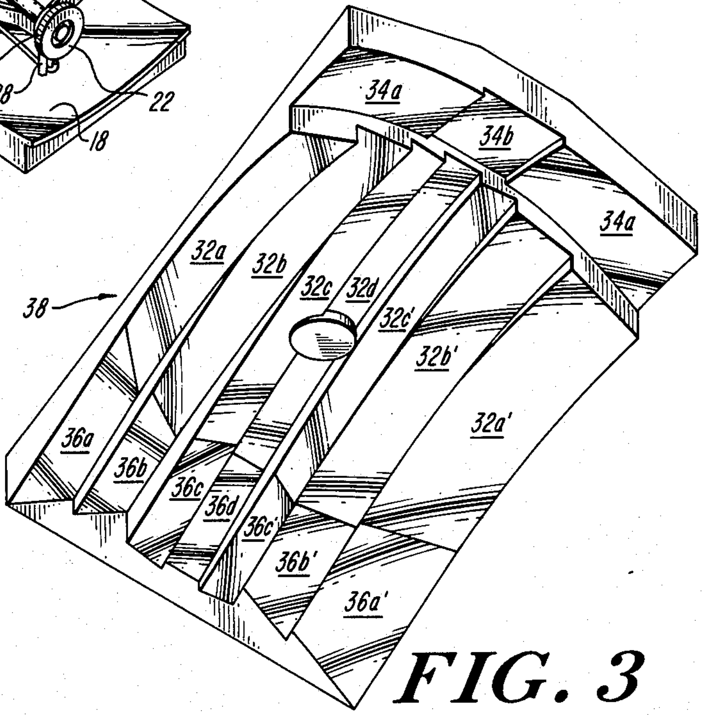
FIG. 3 is a perspective view of the composite mirror of the ceiling mountable passive infrared intrusion detection system according to the present invention.

As can be seen in FIG. 3, which generally designates at 38 a perspective view of the composite field-forming mirror, the composite field-forming mirror 38 has an effectively continuous optical aperture and left-right reflective symmetry about its long mechanical axis. The cylindrical facets *32a*, *32b*, *32c* respectively have the same selectively-twisted cylindrical surface as the facets *32a'*, *32b'*, *32c'* but which are oriented in an opposite spacial sense. The planar facets *36a*, *36b*, *36c* likewise each correspond to the facets *36a'*, *36b'*, and *36c'*. The cylindrical facet *34a* has the same but spacially oppositely oriented selectively-twisted surface as the cylindrical surface *34a'*. The planar facets *36a*, *a'* through *36d* each point in the same direction as corresponding ones of the selectively-twisted cylindrical facets *32a*, *a'* through *32d*, and the cylindrical facets *34a*, *a'* point in the same direction as the cylindrical facets *32a*, *a'* respectively. The central cylindrical facets *32d*, *34b* point in the same direction and have cylindrical surfaces that are not selectively twisted.

Figure 4:
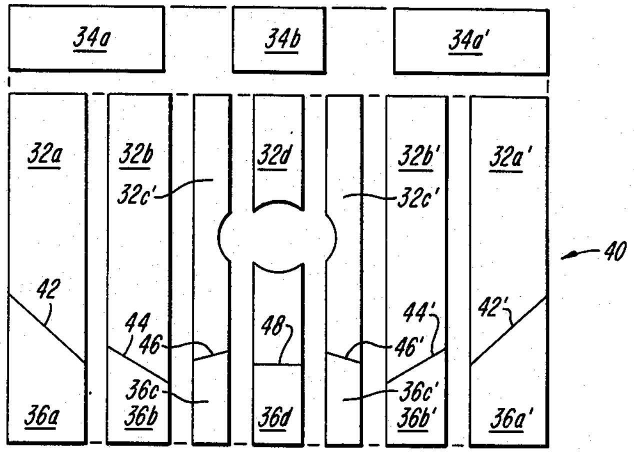
FIG. 4 is an exploded schematic view of the composite mirror of the passive infrared intrusion detection system according to the present invention.

The selectively-twisted cylindrical facets *32a*, *a'* through *32d* are each preferably generated by cutting a cylindrical surface having a longitudinal axis respectively by parallel planar surfaces each having a normal such that the normal to the planar surfaces makes preselected different bias angles to the longitudinal axis of the cylinder defining thereby a corresponding selectively-twisted cylindrical surface when lifted-off the cylinder. As can best be seen in FIG. 4, which generally designates at 40 an exploded schematic view of the composite field-forming mirror, the selectively-twisted cylindrical facets and the planar facets thereof preferably are cut along the following bias angles:

| FACET | ANGLE |
|---|---|
| 32a | 41° 30' |
| 32a' | 41° 30' |
| 32b | 30° |
| 32b' | 30° |
| 32c | 15° |
| 32c' | 15° |
| 32d | 0° |
| 34a | 41° 30' |
| 34a' | 41° 30' |
| 34b | 30° |
| 34b' | 30° |
| 34c | 15° |
| 34c' | 15° |
| 34d | 0° |
| 36a | 41° 30' |
| 36a' | 41° 30' |
| 36b | 0° |

The cylindrical axes of the selectively-twisted cylindrical *32a*, *32a'* are inclined in preferred embodiment by 41° 30 minutes as shown by the lines 42, 42', that of the selectively-twisted cylindrical facets *32b*, *32b'* by 30° as illustrated by the lines 44, 44', that of the facets *32c*, *32c'* by 15° as illustrated by the lines 46, 46', while that of the facet *32d* is not inclined and not selectively twisted as illustrated by the line 48. Each of the planar facets *36a*, *36a'* through *36d* have a normal line, and are spacially oriented relative to a corresponding one of the selectively-twisted cylindrical facets *32a*, *32a'* through *32d* such that the normal to its planar facet is orthogonal to a corresponding one of the longitudinal axes of the selectively-twisted cylindrical facets *32a*, *32a'* through *32d*. The facets *34a*, *34a'*, *34b* are cut along the same bias angle as respective ones of the facets *32a*, *32a'* and *32d*, except that the radius of curvature of the cylinder from which the facets 34 are generated is larger than that from which the facets 32 are generated. Each of the cylinderical facets preferably subtends 22° of arc its generating cylinder. Outer ones of the selectively-twisted cylindrical facets 32, 36, and of the planar facets 34, have comparatively larger cross-sectional areas than inner ones of the facets that very with the cosine of the angle to the detector to provide uniform energy collection areas.

In typical use, the mirror assembly of the invention is ceiling mounted with the optical axis of the focusing mirror 18 generally vertically oriented and with the cylindrical axis of each of the facets *32a*, *32a'* through *32c*, *32c'* and *34a*, *34a'* of the composite field-forming mirror 12 intersecting the optical axis at a non-zero acute angle determined by the bias angle at which the facet was generated, except for the central facets *32d*, *34b*, which intersect the optical axis of the focusing mirror 18 orthogonally. The field of view defining pointing direction of each of selectively-twisted cylindrical facets 32, 34 is determined by the orientation of their respective cylindrical axes, and the field of view defining pointing direction of each of the planar facets 36 is determined by the normal line to corresponding facets.

Figure 5:
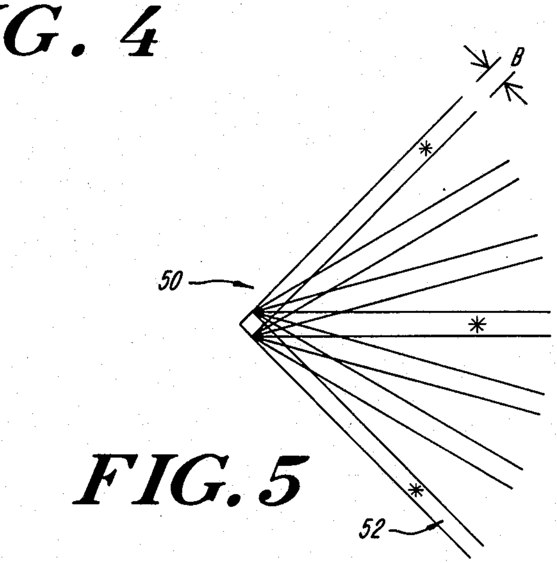
FIG. 5 is a plan view of the fields of view of the ceiling mountable passive infrared intrusion detection system according to the present invention.

As shown in FIG. 5, which generally designates at 50 a plan view of the fields of view of the mirror assembly of the invention, the mirror assembly of the invention is operative to produce seven vertical curtains generally designated 52 of protection through which an intruder must pass when moving about the floor of a protected facility that extend approximately over a quadrant-shaped 86° sector in 15° azimuthally spaced relation in the illustrated embodiment. Each of the first, middle, and bottom ones of the vertical curtains 52 designated with an "*" is illustrated in elevational view in FIG. 6. Each of the fields of view of these vertical curtains include a finger beam 54, a generally vertical first partial curtain 56, and a generally vertical second partial curtain 58. Each of the planar facets *34a*, *34a'* through *34d* are cooperative with the focusing mirror 18 to provide a corresponding finger beam pointing in the direction of the normal to its planar surface defining a uniform detection sensitivity field of view that is relatively narrow in both elevation and azimuth. The extent of elevational variation, designated "A", is determined by the focal length of the focusing mirror and by the size of the detector 20 (FIG. 1). Typically, a 2.5° angle is obtained in the illustrated embodiment.

Figure 6:
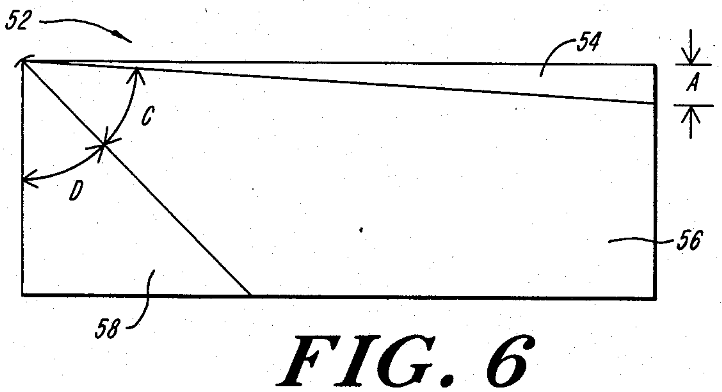
FIG. 6 is an elevational view illustrating one of the fields of view of the passive infrared intrusion detection system according to the present invention.

Each of the selectively-twisted cylindrical facets *32a*, *32a'* through *32d* points in the direction determined by the angle of its longitudinal cylindrical axis, and are individually cooperative with the focusing mirror 18 to provide a corresponding one of the fields of view of the partial vertical curtains 56. The cylindrical facets 32 allow each of the fields of view to be relatively narrow in the horizontal plane, as shown in FIG. 5, and relatively large in the vertical plane, as shown in FIG. 6. The horizontal field of view or divergence angle designated "B" in FIG. 5 is controlled by the focal length of the focusing mirror 10. The curvature and arc length of the selectively twisted cylindrical facets 32 are determined in relation to the curvature of the focusing member 18 to provide the intended vertical field of view or vertical divergence angle designated "C" in FIG. 6. The front and rear edges of the selectively-twisted cylindrical facets 32 determine the limits or extent of the vertical field of view. The forward edge delimites the lower boundary of the field of view, while the upper boundary of this field of view is determined by the rearward edge. In the illustrated embodiment, where each of the segments subtend 22° of arc about the long axis of its generative cylinder, a vertical divergence "C" of about 45° typically is provided, while a horizontal divergence angle of about 5° typically is provided. The selectively-twisted mirror facets 34*a*, 34*a*', and 34*b* each point in the same direction that the facets 32*a*, 32*a*' and 32*d* respectively point, and are cooperative with the focusing mirror 18 to provide the field of view of the second partial vertical curtains 58 in FIG. 6. The facets 34, like the facets 32, allow each of the fields of view to be relatively narrow in the horizontal plane, and relatively large in the vertical plane. The horizontal field of view is likewise controlled by the focal length of the focusing mirror 18, and the curvature and arc length of the selectively-twisted cylindrical facets 34 again are determined in relation to the curvature of the focusing mirror to provide the intended vertical field of view, which in the illustrated embodiment, is designated "D" and is typically 45°

It will be appreciated that many variations of the presently disclosed invention will become apparent to those skilled in the art without departing from the scope of the appended claims.

What is claimed is:

1. A ceiling mountable passive infrared intrusion detection system, comprising:

a focusing mirror having an optical axis and a point focus;

a composite field-forming mirror defining an optical aperture and confronting the focusing mirror for deviating infrared energy present in the optical aperture of the field-forming mirror onto the focusing mirror;

an infrared detector positioned along the optical axis of the focusing mirror and at the point focus thereof for providing an electrical signal indication of intruder presence in response to infrared energy deviated thereto by the focusing mirror; and said composite field-forming mirror having a first plurality of laterally adjacent and selectively-twisted cylindrical facets in strip-form that are individually cooperative with said focusing mirror for providing a corresponding one of a first plurality of partial vertical curtains in selected azimuthal spacing that are each comparatively wide in elevation and comparatively narrow in azimuth, with individual ones of the selectively-twisted cylindrical facets having a cylindrical axis that intersects the optical axis of the focusing mirror at a preselected different non-zero acute angle.

2. The system of claim 1, wherein said composite field-forming mirror defines an effectively continuous optical aperture.

3. The system of claim 1, wherein said composite field-forming mirror further includes a second plurality of laterally adjacent and selectively-twisted cylindrical facets in strip-form that are individually cooperative with said focusing mirror for providing a corresponding one of a second plurality of partial vertical curtains in a selected azimuthal spacing that are each comparatively wide in elevation and comparatively narrow in azimuth, with individual ones of the second plurality of selectively-twisted cylindrical facets having a cylindrical axis that intersects the optical axis of the focusing mirror at a preselected different non-zero acute angle, and with said second plurality of partial curtains being cooperative with corresponding ones of said first plurality of partial curtains to provide full vertical curtains of protection.

4. The system of claim 3, wherein said first and second pluralities of selectively-twisted cylindrical facets are defined by preselected regions of a cylinder having a longitudinal axis selected by spaced parallel planes each having a normal such that the normal to the planes intersects said longitudinal axis of said cylinder respectively at corresponding ones of said preselected different non-zero acute angles.

5. The system of claim 4, wherein said composite field-forming mirror further includes a third polarity of laterally adjacent planar facets each having a normal such that individual ones of the normals to the planar facets are orthogonal to corresponding ones of the cylindrical axes of the selectively-twisted cylindrical facets.

6. The system of claim 4, wherein respective ones of said first and second pluralities of selectively-twisted cylindrical facets are defined by respective cylinders having selectively different radii.

7. The system of claim 1, further including means coupled between said composite field-forming mirror and said focusing mirror for rotatably mounting said field-forming mirror for selected tilting motion relative to said focusing mirror.

8. The system of claim 7, wherein said rotatable mounting means includes a knob having a cam surface.

* * * * *

UNITED STATES PATENT AND TRADEMARK OFFICE
CERTIFICATE OF CORRECTION

PATENT NO. : 4,625,115

DATED : November 25, 1986

INVENTOR(S) : John K. Guscott

It is certified that error appears in the above-identified patent and that said Letters Patent is hereby corrected as shown below:

Column 3, line 64, "drical 32a," should read --drical facets 32a,--.

Column 4, line 14, "cylinderical" should read --cylindrical--.

Column 4, line 18, "very" should read --vary--.

Column 5, line 11, "delimites" should read --delimits--.

Column 5, line 16, "divergence "C"" should read --divergence angle "C"--.

Column 6, line 38, "polarity" should read --plurality--.

Signed and Sealed this

Eighth Day of March, 1988

*Attest:*

DONALD J. QUIGG

*Attesting Officer* *Commissioner of Patents and Trademarks*